Dec. 30, 1941. T. RUMMEL 2,268,093
ARRANGEMENT FOR PREVENTING ELECTRIC DISCHARGES
FROM ASSUMING THE FORM OF AN ARC
Filed Feb. 12, 1938
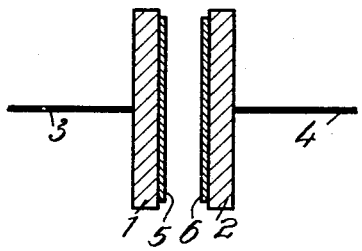
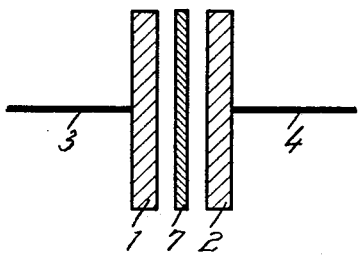
Inventor:
Theodor Rummel
by his atty.

Patented Dec. 30, 1941

2,268,093

UNITED STATES PATENT OFFICE 2,268,093

ARRANGEMENT FOR PREVENTING ELECTRIC DISCHARGES FROM ASSUMING THE FORM OF AN ARC

Theodor Rummel, Berlin-Charlottenburg, Germany

Application February 12, 1938, Serial No. 190,350
In Germany October 8, 1937

3 Claims. (Cl. 176—122)

The present invention relates to an arrangement for preventing electric discharges from assuming the form of an arc.

If two metal surfaces are placed opposite to each other and a voltage is applied thereto an ionization of the air gap by collision occurs at a certain field strength. Means have already been proposed for preventing electric discharges from taking the form of an arc. If compact insulation layers are employed, such as, for instance, glass plates, as is the case with ozone apparatus impressed with an alternating voltage, the stabilization is brought about by limiting the dielectric displacement currents. In the case of the usual autovalve arresters another principle is applied. Here the increase of the current is limited by so-called semi-conductors.

However, the above-mentioned arrangements present the following drawbacks:

If the discharge is prevented by compact insulation layers only alternating current may be used; furthermore, the current load capacity is, other conditions being equal, proportional to the frequency. The limitation of current by semiconductors has the disadvantage that considerable amounts of energy are lost by ohmic heat.

The present invention is based on the novel principle that the electric discharges are prevented from assuming the form of an arc by inserting in the discharge path porous stabilization bodies. The pores may, for instance, extend from the body surface on one side to the other side as is the case with electrolytically produced aluminum oxide coatings. In this manner a very favorable ratio of the longitudinal conductivity to the cross-conductivity is attained. However, it is not absolutely necessary that the layers be produced in this manner; it suffices if the stabilization layer is, as a rule, porous.

The accompanying drawing shows the insertion of such a porous stabilization body into the discharge path of a gap. In the drawing—

Fig. 1 represents diagrammatically a stabilization body attached to each electrode, and Fig. 2 represents a stabilization body freely interposed between the gap electrodes.

Referring to Fig. 1, two electrode plates 1, 2 are disposed opposite one another and the discharge is assumed to occur through the gap between these plates. Each electrode is connected to the current source by the leads 3 and 4 respectively. In order to stabilize the discharge between these plates, each plate is covered, according to the invention, with a porous layer 5, 6 respectively. These layers may consist of various materials, and may, for instance, be electrolytically produced as aforementioned.

Fig. 2 shows the electrodes in similar relative arrangement as in Fig. 1. In this case, however, a stabilization layer is not attached to the active surfaces of the electrodes, but an individual stabilization body 7 is set between them, contacting either both electrodes or only one of them or being spaced from both, as Fig. 2 shows.

The means described may be used to advantage in any place where it is necessary to prevent electric discharges from assuming the form of an arc such as, for example, in ozone apparatus, or in high tension open air lines, or in glow lamps.

As stabilization layers, porous metal oxides which are preferably produced by the electrolytic method, porous silicates (porous porcelain), porous sorts of glass and porous products of artificial resin may be employed with success. These materials may be applied by mechanical or other methods and may also be subjected to a subsequent treatment. The arrangement may be employed to advantage, besides in atmospheric air at normal pressure, also in other gases, gas mixtures, vapors, vapor mixtures and suspensions with a certain percentage of gas. The pressure may assume also values differing from atmospheric pressure. In any event, the essential feature is that in all cases where electric discharges are to be prevented from changing over to an arc, porous stabilization layers are placed in the discharge path and are preferably arranged at the side of the electrodes facing the discharge.

What is claimed is:

1. Means for producing continuous and arcless electric discharges, comprising two metallic discharge electrodes spaced from each other and forming a laterally extensive discharge gap, and an imperforate and coherent insulating body of artificial resinous material disposed between said electrodes for stabilizing the discharge, said body extending continuously over substantially the whole lateral extent of said gap and having pores extending from one to the other lateral side so as to allow the discharge between the metallic surfaces of said electrodes to pass through said pores, whereby said means are capable of producing arcless direct current discharges through the pores of said resinous body.

2. Means for producing continuous and arcless electric discharges, comprising two discharge electrodes spaced from each other and forming a laterally extensive discharge gap, at least one of said electrodes consisting of light metal and having its surface bordering said gap covered continuously with a porous oxide coating for stabilizing the discharge, said oxide coating having pores extending from one to the other lateral side so as to allow the discharge between the metallic surfaces of said electrodes to pass through said pores.

3. Means for producing continuous and arcless electric discharges, comprising two metallic discharge electrodes spaced from each other and forming a laterally extensive discharge gap and an imperforate and coherent body of porous material disposed between said electrodes for stabilizing the discharge so as to extend continuously over substantially the entire lateral extent of said gap, said body consisting of artificial insulating material having pores extending from one to the other lateral side to allow the discharge between the metallic surfaces of said electrodes to pass through said body.

THEODOR RUMMEL.